(12) United States Patent
Haraguchi

(10) Patent No.: US 7,707,994 B2
(45) Date of Patent: May 4, 2010

(54) FUEL INJECTION CONTROLLER

(75) Inventor: Hiroshi Haraguchi, Kariya (JP)

(73) Assignee: Denso Corporation, Kariya (JP)

( * ) Notice: Subject to any disclaimer, the term of this patent is extended or adjusted under 35 U.S.C. 154(b) by 342 days.

(21) Appl. No.: 11/951,105

(22) Filed: Dec. 5, 2007

(65) Prior Publication Data

US 2008/0147299 A1   Jun. 19, 2008

(30) Foreign Application Priority Data

Dec. 14, 2006   (JP) .............................. 2006-336496

(51) Int. Cl.
*F02M 51/00* (2006.01)
*F02M 51/06* (2006.01)

(52) U.S. Cl. ...................... 123/479; 123/501

(58) Field of Classification Search ................. 123/479, 123/198 D, 501, 478, 480; 701/84, 103
See application file for complete search history.

(56) References Cited

U.S. PATENT DOCUMENTS 6,907,861 B2   6/2005   Asano et al.

7,007,664 B2 *  3/2006  Takemoto et al. ............ 123/305

FOREIGN PATENT DOCUMENTS

| JP | 9-195838 | 7/1997 |
|----|----------|--------|
| JP | 9-217648 | 8/1997 |
| JP | 2005-36788 | 2/2005 |

* cited by examiner

*Primary Examiner*—Mahmoud Gimie
(74) *Attorney, Agent, or Firm*—Nixon & Vanderhye PC

(57) ABSTRACT

A single fuel injection is performed in either one of cylinders during fuel cut control of a diesel engine to sense torque generated with the single fuel injection based upon an increase amount of rotation speed of a crankshaft at the time. Presence/absence of abnormality in an injection start timing of an injector is determined based on a difference in torque caused when the single fuel injection is performed at multiple command injection start timings. Thus, the presence/absence of the abnormality in the injection start timing can be sensed without using a nozzle lift sensor, whereby inhibiting an increase in the number of components.

10 Claims, 15 Drawing Sheets

FUEL INJECTION CONTROLLER

CROSS REFERENCE TO RELATED APPLICATION

This application is based on and incorporates herein by reference Japanese Patent Application No. 2006-336496 filed on Dec. 14, 2006.

BACKGROUND OF THE INVENTION

1. Field of the Invention

The present invention relates to a fuel injection controller that performs fuel injection control by operating an injector of a compression ignition type internal combustion engine.

2. Description of Related Art

Recently, regulations on exhaust gas characteristics of a diesel engine (compression ignition type internal combustion engine) have been increasingly strengthened. Under such the situation, it is demanded to execute processing of determining presence/absence of abnormality in an injector which injects and supplies fuel into a combustion chamber of the diesel engine. It is because when the abnormality occurs in the injector, the fuel injection control cannot be appropriately performed, thereby possibly deteriorating the exhaust characteristics.

Therefore, for example, as described in Patent Document 1 (JP-A-H9-195838), there is conventionally proposed a fuel injection controller which is provided with a nozzle lift sensor for sensing a lift amount of an injection nozzle in an injector. The controller calculates a difference between target valve-opening timing and actual valve-opening timing of the injector based upon a sensing value of the nozzle lift sensor and determines presence/absence of abnormality in an injection start timing of the injector based upon the difference.

With the controller describe above, the presence/absence of the abnormality of the injection start timing can be determined. However, it is required to provide the nozzle lift sensor, leading to an increase in the number of components.

SUMMARY OF THE INVENTION it is an object of the present invention to provide a fuel injection controller capable of determining presence/absence of abnormality in an injection start timing without using a nozzle lift sensor when performing fuel injection control by operating an injector for a compression ignition type internal combustion engine.

According to an aspect of the present invention, a fuel injection controller has an injection device for setting a plurality of command injection start timings commanded to an injector to inject fuel from the injector, a torque sensing device for sensing torque generated through injection of the fuel performed by the injection device and a determining device for determining presence/absence of abnormality in an injection start timing of the injector based upon a magnitude relation between sensing values of the torque sensing device corresponding to the plurality of the command injection start timings.

Even if the injector injects the same quantity of the fuel, the output torque generated by providing the fuel to combustion differs when the injection start timing differs. Focusing attention on this respect, the present invention sets a plurality of command injection start timings and compares the magnitudes of the generated torque respectively corresponding to the set command injection start timings. If the injector starts the injection of the fuel in accordance with the command injection start timing, the injection is started at different timings corresponding to the different command injection start timings. Therefore, a difference is caused in the torque generated by the different fuel injections. When the injector does not start the fuel injection appropriately in accordance with the command injection start timing, there is a possibility that no difference is caused in the torque generated by the respective fuel injections. Accordingly, the presence/absence of the abnormality in the injection start timing of the injector can be determined based upon a magnitude relation between the sensing values of the torque corresponding to the plurality of command injection start timings.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
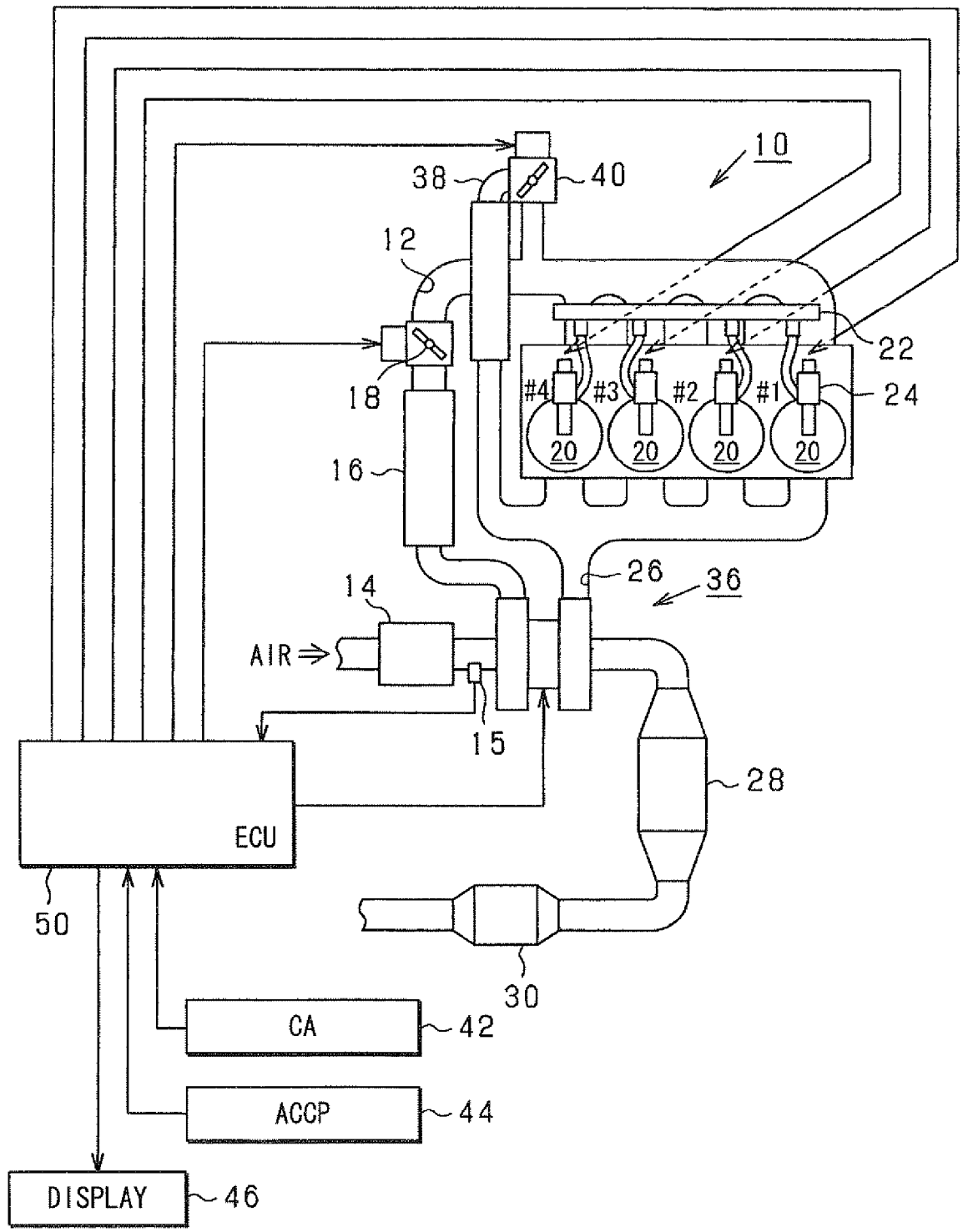
FIG. 1 is a diagram showing an entire construction of an engine system according to a first embodiment of the present invention.

Now, a fuel injection controller according to a first embodiment of the present invention applied to a fuel injection controller for a vehicular diesel engine will be explained with reference to the drawings. FIG. 1 shows an entire construction of an engine system according to the present embodiment. As shown in FIG. 1, an air cleaner 14, an airflow meter 15, a cooler 16, a throttle valve 18 and the like are provided upstream of an intake passage 12 of a diesel engine 10. The intake passage 12 communicates with combustion chambers 20 of respective cylinders (here, four cylinders of first cylinder #1 to fourth cylinder #4 are shown as an example). High-pressure fuel accumulated in a common rail 22 is injected through injectors 24 into the combustion chambers 20. In consequence, a mixture of fuel and air in the combustion chamber 20 is provided for combustion to produce a rotational force of the diesel engine 10.

An exhaust gas as the mixture of the fuel and the air provided for combustion is discharged into an exhaust passage 26. The exhaust passage 26 is provided with an oxidation catalyst 28 and a NOx occlusion reduction catalyst 30 for occluding and reducing nitrogen oxides (NOx).

The intake passage 12 and the exhaust passage 26 are provided with a variable nozzle type turbocharger 36. The intake passage 12 and the exhaust passage 26 are provided with an exhaust gas recirculation passage (EGR passage 38) for connecting the intake passage 12 and the exhaust passage 26. A flow path area between the intake passage 12 and the EGR passage 38 can be regulated by an EGR valve 40.

The engine system is further provided with various sensors for sensing an operating condition of the diesel engine 10 such as a crank angle sensor 42 for sensing a rotational angle of a crankshaft (crank angle: CA) of the diesel engine 10. In addition, the engine system is provided with various sensors for sensing a demand of a user such as an accelerator sensor 44 for sensing a depressing amount (ACCP) of an accelerator pedal.

An electronic control unit (ECU 50) is constructed of a central processing unit, a memory and the like. The ECU 50 operates various actuators such as the injector 24 based upon sensing values of the various sensors for sensing the operating condition of the diesel engine 10 and the demand of the user. Thus, the ECU 50 controls output characteristics (output torque, exhaust characteristics and the like) of the diesel engine 10. Particularly, the ECU 50 performs fuel injection control for controlling a fuel injection quantity and a fuel injection timing in order to control the output characteristics. For example, the ECU 50 calculates a required injection quantity of the diesel engine 10 in accordance with rotation speed based upon the sensing value of the crank angle sensor 42 and the depressing amount ACCP of the accelerator pedal sensed by the accelerator sensor 44. The ECU 50 operates the injector 24 based upon the calculated required injection quantity to control the output torque to the required torque corresponding to the depressing amount ACCP of the accelerator pedal.

The ECU 50 also executes processing of determining presence/absence of abnormality (injection start timing abnormality) that an actual injection start timing of the injector 24 does not follow a command value of an injection start timing (a command injection start timing) commanded to the injector 24.

Figure 2:
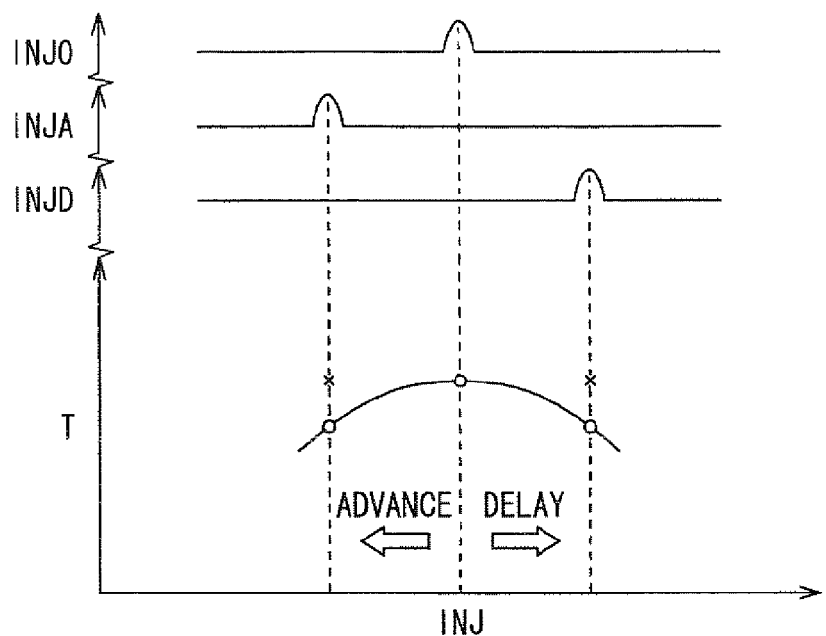
FIG. 2 is a diagram showing a relation between an injection start timing and generated torque.

In the present embodiment, as shown in FIG. 2, the same injection quantity of the fuel is injected at a injection start timing (a reference injection timing INJ0) with which the torque T is substantially maximized and also at an injection start timing INJA advanced from the reference injection timing INJ0 and at an injection start timing INJD delayed from the reference injection timing INJ0. In the case where the injector 24 starts the fuel injection appropriately in accordance with the command injection start timing, it is considered that the output torque T of the diesel engine 10 declines when the injector 24 is operated at the command injection start timing (INJA or INJD) advanced or delayed from the reference injection timing INJ0 as compared to the output torque T generated when the injector 24 is operated at the reference injection timing INJ0 as shown by circle marks in FIG. 2. In the case where the actual injection start timing of the injector 24 does not coincide with an appropriate timing corresponding to the command injection start timing, there is a possibility that the output torque T of the diesel engine 10 does not decline when the injector 24 is operated at the command injection start timing (INJA or INJD) advanced or delayed from the reference injection timing INJ0 as compared to the output torque T generated when the injector 24 is operated at the reference injection timing INJ0 as shown by x marks in FIG. 2. The present embodiment focuses attention on this phenomenon to determine presence/absence of abnormality in the injection start timing of the injector 24. In detail, in the present embodiment, a small quantity of fuel is injected through the injector 24 during fuel cut control and the output torque is sensed based upon an increase amount of the rotation speed of the crankshaft at the time.

Figure 3:
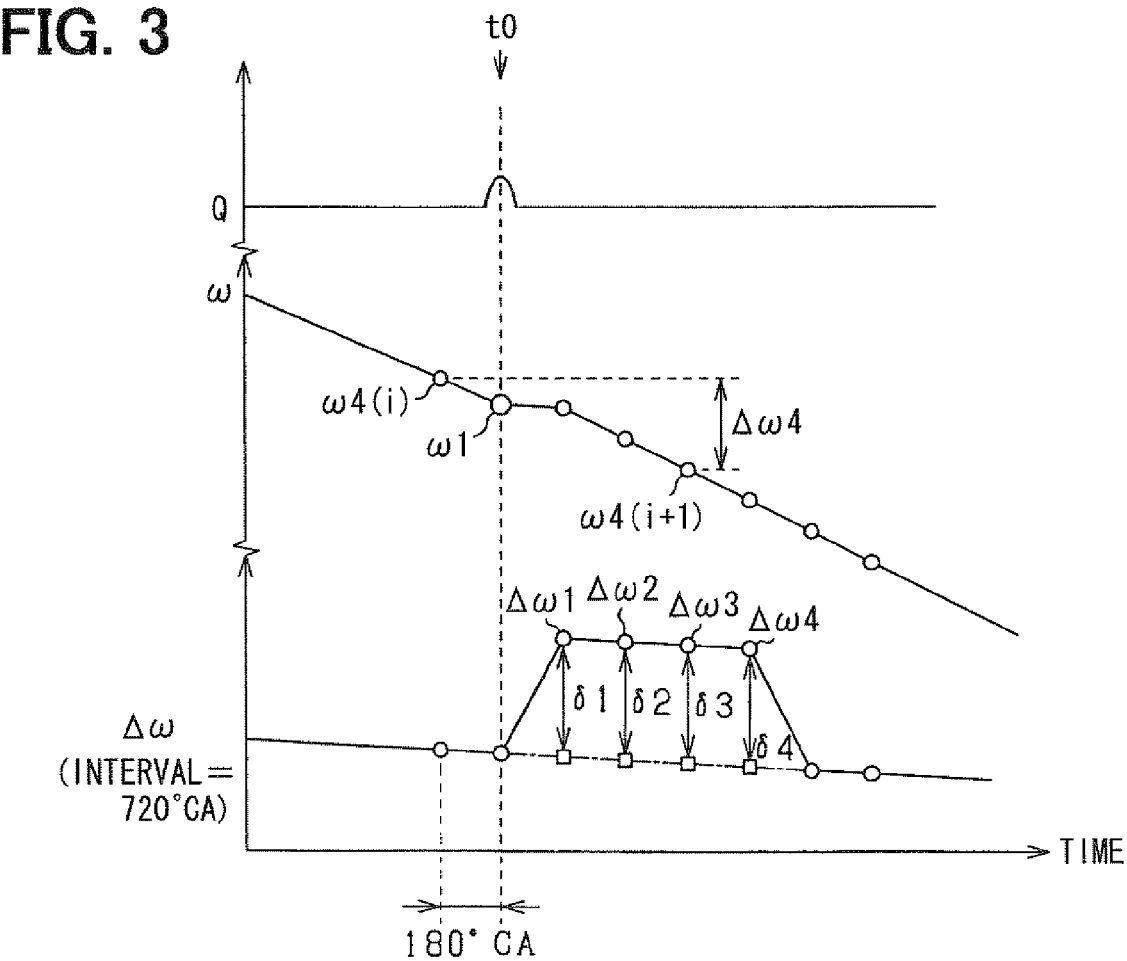
FIG. 3 is a diagram showing a sensing method of the torque according to the first embodiment.

Next, this scheme will be explained in detail. FIG. 3 shows a fuel injection mode for determining presence/absence of abnormality in the injection start timing according to the present embodiment. In detail, FIG. 3 shows a transition of a command injection quantity Q of the injector 24, a transition of rotation speed ω of the crankshaft during the fuel cut control and a transition of a fluctuation amount Δω of the rotation speed ω. In FIG. 3, t0 shows a timing of the single injection.

As shown in FIG. 3, the rotation speed ω of the crankshaft declines during the fuel cut control. Under the situation, the rotation speed ωn of the nth cylinder (n=1 to 4) is calculated at an interval of 720° CA based upon the sensing result of the crank angle sensor 42. If a single injection of a small quantity fuel is performed in an arbitrary cylinder, the declining degree of the rotation speed ω is alleviated. The fluctuation amount Δωn of the rotation speed ωn is calculated to quantify a change of the declining degree. The fluctuation amount Δωn is a difference between rotation speed ωn(i) and rotation speed ωn(i+1) at crank angles distant from each other by 720° CA. In this example, the fluctuation amount is calculated based upon sampling values of the rotation speed ωn sampled near compression top dead center of each cylinder. The fluctuation amount Δωn reduces during the fuel cut control but increases once if the single injection of the small fuel quantity is performed as shown in FIG. 3.

If the single injection is not performed during the fuel cut control, the rotation fluctuation amount $\Delta\omega n$ is supposed to gradually reduce as shown by a dashed line in FIG. 3. Therefore, a rotation fluctuation amount $\Delta\omega n$ assumed in the case where the single injection is not performed can be estimated based upon a rotation fluctuation amount $\Delta\omega n$ preceding the single injection. A difference between the rotation fluctuation amount $\Delta\omega n$ assumed in the case where the single injection is not performed and the actual rotation fluctuation amount $\Delta\omega n$ generated when the single injection is performed is quantified as a rotation increase amount $\delta n$. A product of an average value $\delta a$ of the rotation increase amounts $\delta n$ of all cylinders and the rotation speed $\omega 0$ of the crankshaft at the time when the single injection is performed is an amount proportional to the output torque T of the diesel engine 10.

Figure 4:
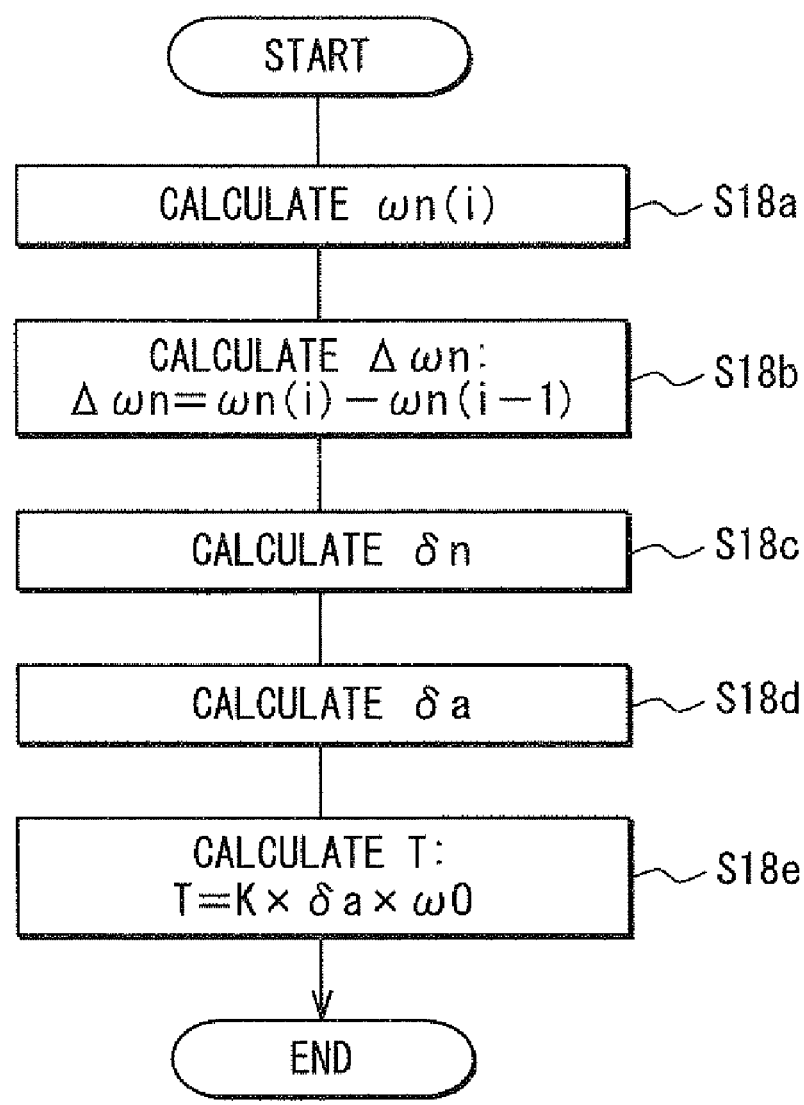
FIG. 4 is a flowchart showing a processing order of sensing processing of the torque according to the first embodiment.

FIG. 4 shows a processing order of processing for calculating the output torque T caused by the single injection. In a series of the processing, first at step S18a, the rotation speed $\omega n(i)$ is calculated based upon the sensing value of the crank angle sensor 42. At next step S18b, the fluctuation amount $\Delta\omega n$ is calculated. At step S18c, the rotation increase amount $\delta n$ is calculated as a difference between the fluctuation amount assumed in the case where the single injection is not performed and a corresponding actual fluctuation amount $\Delta\omega n$. At step S18d, the average value $\delta a$ ($=(\delta 1+\delta 2+\delta 3+\delta 4)/4$) of the rotation increase amount $\delta n$ is calculated. At step S18e, the torque T is calculated by multiplying a product of the average value $\delta a$ and the rotation speed $\omega 0$ by a proportional constant K.

Figure 5:
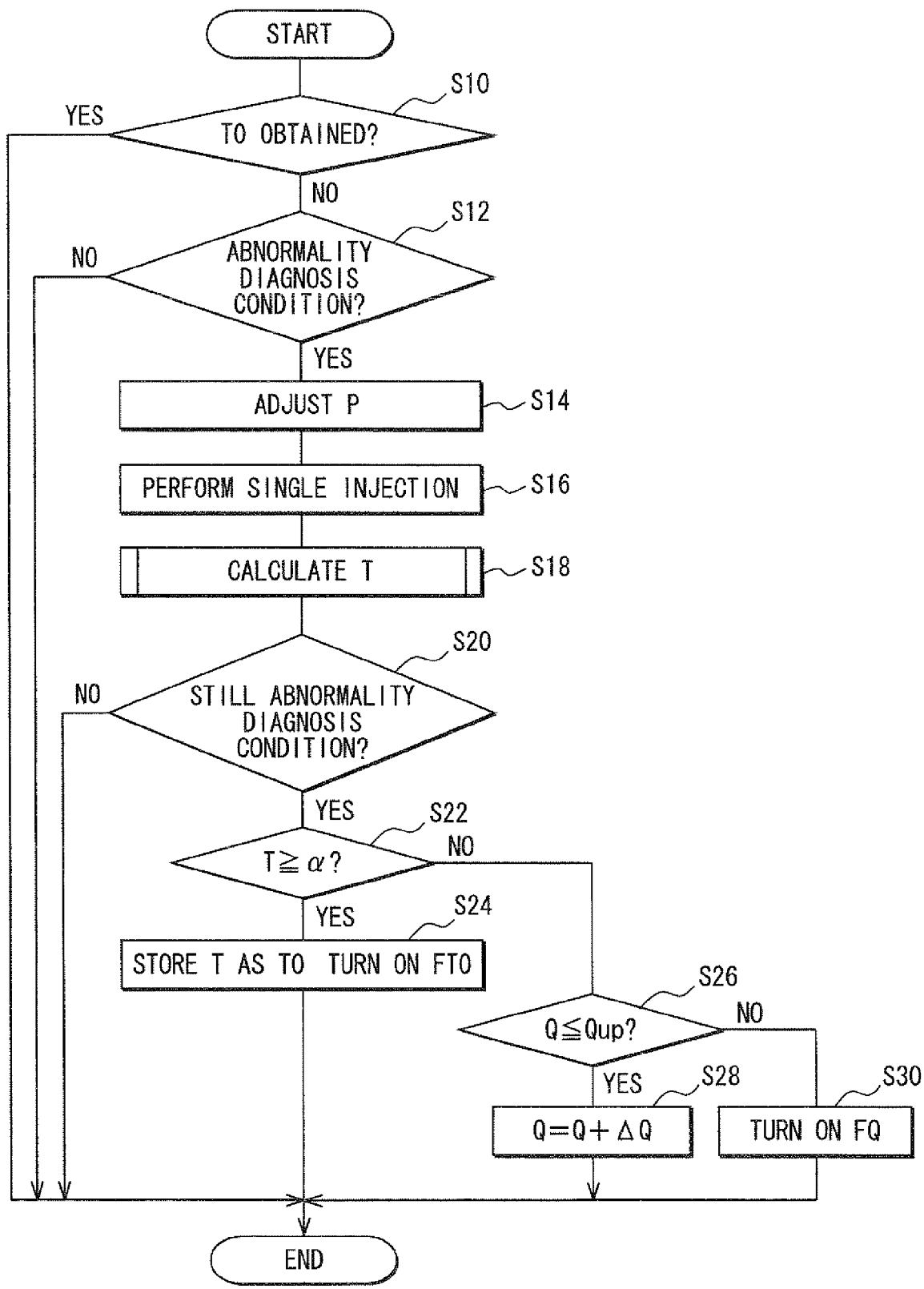
FIG. 5 is a flowchart showing a processing order of sensing processing of the torque corresponding to a reference injection timing according to the first embodiment.

Next, determination processing of the presence/absence of the abnormality in the injection start timing according to the present embodiment will be explained. FIG. 5 shows a processing order of processing for performing the single injection at the injection start timing substantially maximizing the torque as part of the determination processing of the presence/absence of the abnormality in the injection start timing. The ECU 50 repeatedly performs the processing shown in FIG. 5 for each cylinder, e.g., in a predetermined cycle.

In a series of the processing, first at step S10, it is determined whether torque T0 corresponding to a reference injection timing INJ0 has been already obtained. The reference injection timing INJ0 is an injection start timing substantially maximizing the torque. The reference injection timing INJ0 is beforehand adapted as a feedforward operational amount. In detail, the reference injection timing INJ0 is defined as an injection timing for bringing an ignition timing to proximity of the compression top dead center. When it is determined that the torque T0 at the reference injection timing INJ0 has not been obtained yet, it is determined at step S12 whether or not an abnormality diagnosis condition is established. The abnormality condition includes the following.

(a) Condition that the fuel cut control is performed as the injection quantity corresponding to the required torque becomes equal to zero or less.

(b) Condition that the crankshaft and drive wheels are not integrally connected and a slip can occur between the crankshaft and the drive wheels. For example, in the case where an output shaft of the diesel engine 10 is connected to the drive wheels through a manual transmission, the condition may be a condition that the transmission is in a neutral state. In the case where the output shaft of the diesel engine 10 is connected to the drive wheels through an automatic transmission with plural gear ranges, the condition may be a condition that the transmission is in a disengagement state of a lockup clutch.

If it is determined at step S12 that the abnormality diagnosis condition is established, fuel pressure P (injection pressure) in the common rail 22 is fixed to a predetermined injection pressure at step S14. This processing is executed for equalizing the conditions other than the injection start timing when the single injection is performed by changing the injection start timing for determining the presence/absence of the abnormality in the injection start timing. At next step S16, the single injection is performed. A command value of the injection quantity (command injection quantity) at the time should be preferably a small injection quantity to the extent that deterioration of drivability or deterioration of exhaust characteristics caused by the injection quantity is negligible.

At next step S18 torque T caused by the single injection is calculated. The processing is shown in FIG. 4. At next step S20, it is determined whether or not the abnormality diagnosis condition described at step S12 is still established continuously. This processing determines whether or not the condition for appropriately calculating the output torque T has been established on the occasion of the single injection and of the sampling of the rotation speed $\omega n$ used for calculating the torque T caused by the single injection. If it is determined that the condition has been established continuously, it is determined at step S22 whether or not the calculated torque T is equal to or greater than a predetermined value $\alpha$. In order to eliminate an influence of noises when the torque T is sensed, the predetermined value $\alpha$ is set at a value larger than torque assumed to be calculated when the noises are mixed into the output of the crank angle sensor 42 under a situation where the output torque is not generated. Also, the predetermined value $\alpha$ is set based upon a lower limit value of values enabling distinctive detection of a difference between the torque caused by the single injection performed at the injection start timing (INJA or INJD) advanced or delayed from the reference injection timing INJ0 and the torque caused by the single injection performed at the reference injection timing INJ0.

If it is determined at step S22 that the torque is equal to or greater than the predetermined value $\alpha$, the torque T is stored as torque T0 at the reference injection timing INJ0 at step S24. Further, a torque obtainment completion flag FT0 of the reference injection timing INJ0 is set to ON. In consequence, until the same flag FT0 is set to OFF after that, the affirmative determination is made at step S10.

When it is determined at step S22 that the torque T is less than the predetermined value $\alpha$, it is determined at step S26 whether or not the command injection quantity Q of the single injection is equal to or less than a predetermined upper limit value Qup. The upper limit value Qup is set based upon an upper limit value of the injection quantity assumed to provide the calculated torque equal to or greater than the predetermined value $\alpha$ regardless of the individual difference when the fuel is injected by the injector 24 in accordance with the command injection quantity Q. The upper limit value Qup is set to be less than an upper limit value, above which the deterioration of the drivability or the deterioration of the exhaust characteristics is not negligible. When it is determined at step S26 that the command injection quantity Q is equal to or less than the upper limit value Qup, the command injection quantity Q for the single injection is increased by a predetermined quantity $\Delta Q$ at step S28 to prepare for the next single injection. If the negative determination is made at step S26, an injection quantity abnormality flag FQ is set to ON at step S30. That is, when the torque T does not become equal to or greater than the predetermined value $\alpha$ although the command injection quantity Q exceeds the upper limit value Qup, it is determined that the abnormality occurs in the injection quantity of the injector 24 and the injection quantity abnormality flag FQ is set to ON.

If affirmative determination is made in the processing at step S10, if negative determination is made in the processing at S12 or S20 or if the processing at step S24, S28 or S30 is completed, the series of the processing ends once.

Figure 6:
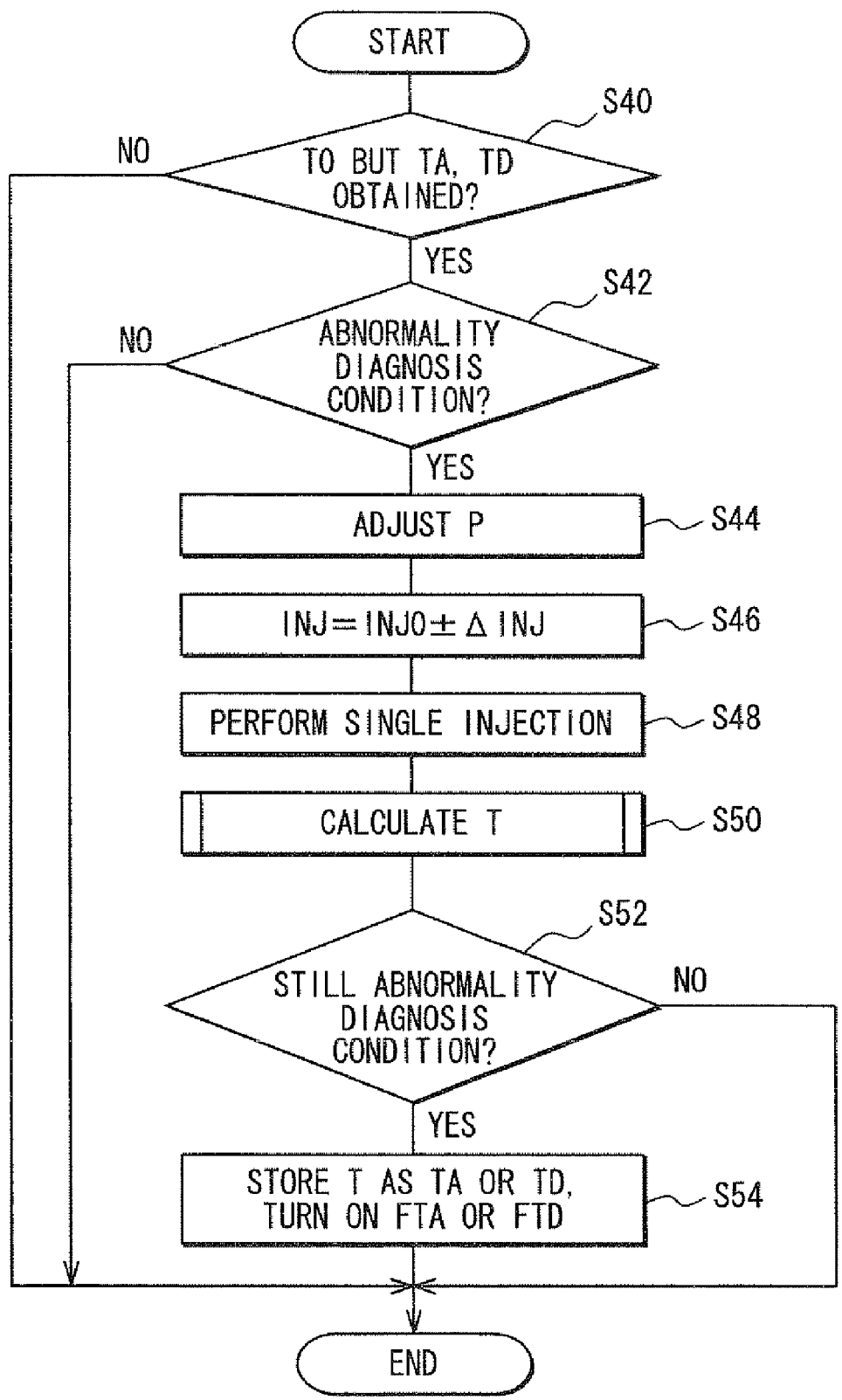
FIG. 6 is a flowchart showing a processing order of sensing processing of the torque at an advanced injection timing or a delayed injection timing according to the first embodiment.

FIG. 6 shows a processing order of processing for performing the single injection at the injection start timing advanced or delayed from the injection start timing substantially maximizing the torque as part of the determination processing of the presence/absence of the abnormality of the injection start timing according to the present embodiment. The ECU 50 repeatedly performs the processing for each cylinder, for example, in a predetermined cycle.

In a series of the processing, it is determined at step S40 whether or not obtainment of the torque T0 generated by the single injection at the reference injection timing INJ0 is complete and obtainment of the torque TA, TD generated by the single injections at the advanced injection start timing and the delayed injection start timing is incomplete. When the affirmative determination is made at step S40, it is determined at step S42 whether or not the abnormality diagnosis condition is established. The abnormality diagnosis condition is the same as the condition used at step S12. If it is determined that the abnormality diagnosis condition is established, the fuel pressure P in the common rail 22 is fixed at step S44 in the same way as step S14 in FIG. 5, Further, the injection start timing INJ is set by advancing or delaying the injection start timing INJ from the reference injection timing INJ0 by a predetermined amount ΔINJ. At step S48, the single injection is performed at the shifted injection start timing INJ. The injection quantity at the time is the same as the injection quantity at the time when the torque T is calculated with the single injection at the reference injection timing INJ0 and is finally stored in FIG. 5. That is, the injection quantity is set to be the same as the injection quantity predetermined for the single injection at the reference injection timing INJ0 when the processing at step S28 is not executed. If the processing at step S28 is executed, the injection quantity is set at a final value of the increased injection quantity.

At next step S50, the torque T accompanying the single injection is calculated. It is determined at step S52 whether or not the abnormality diagnosis condition is still established continuously. The purpose of the processing is the same as the purpose of the processing at step S20 in FIG. 5. If it is determined that the abnormality diagnosis condition is established at step S52, the torque T calculated at step S50 is stored as the torque TA on the advanced side or the torque TD on the delayed side and an advanced side torque obtainment completion flag FTA or a delayed side torque obtainment completion flag FTD is set to ON at step S54. When both of the flags FTA, FTD are set to ON, the negative determination is made at step S40.

When the negative determination is made in the processing at step S40, S42 or S52 or when the processing at step S54 is completed, the series of the processing ends once.

Figure 7:
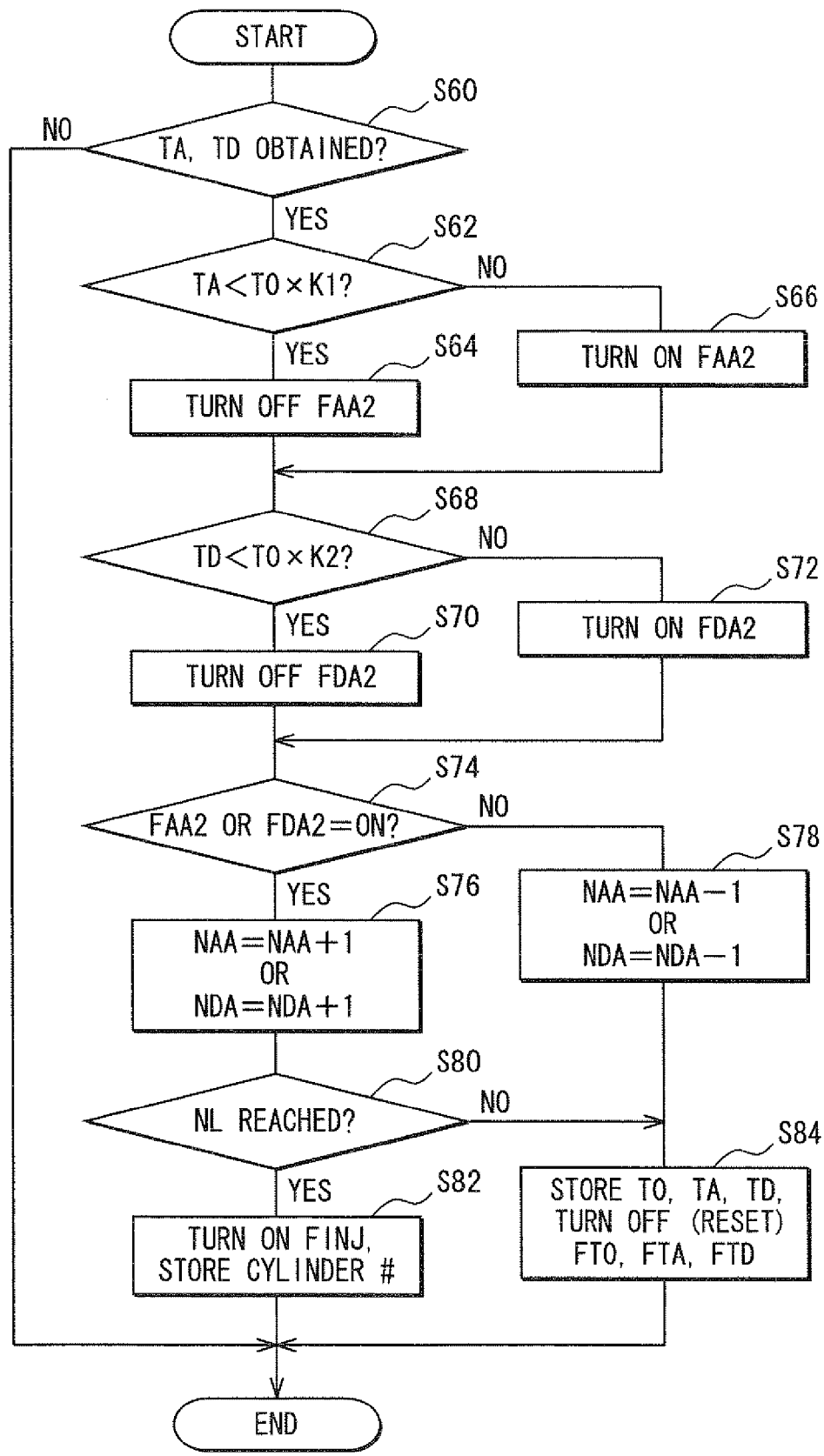
FIG. 7 is a flowchart showing a processing order of determination processing of presence/absence of abnormality in an injection start timing according to the first embodiment.

FIG. 7 shows a processing order of processing after the obtainment of the torque corresponding to each injection start timing as part of the determination processing of the presence/absence of the abnormality of the injection start timing according to the present embodiment. The ECU 50 repeatedly performs the processing for each cylinder, for example, in a given cycle.

In a series of the processing, it is determined at step S60 whether or not the obtainment of the torque TA, TD at the advanced injection start timing INJA and the delayed injection start timing INJD is completed. That is, it is determined whether or not both of the advanced side torque obtainment completion flag FTA and the delayed side torque obtainment completion flag FTD are set to ON at step S54 in FIG. 6. At next step S62, it is determined whether or not the torque TA generated by the single injection at the advanced injection start timing INJA is smaller than the torque T0 generated by the single injection at the reference injection timing INJ0 by at least a predetermined amount. In this embodiment, it is determined whether or not the torque TA generated by the single injection at the advanced injection start timing INJA is smaller than a value obtained by multiplying the torque T0 generated by the single injection at the reference injection timing INJ0 by a predetermined coefficient K1 (0<K1<1). This processing determines whether or not the actual injection start timing is correctly advanced by setting the command injection start timing INJ to the advanced side.

When the affirmative determination is made at step S62, the processing goes to step S64. At step S64, an advance abnormality preliminary flag FAA2 is set to OFF. The advance abnormality preliminary flag FAA2 relates to preliminary determination of whether or not the actual injection start timing is correctly advanced when a command for advancing the injection start timing of the injector 24 is made. That is, at Step S64, it is preliminarily determined that the actual injection start timing is correctly advanced. When the negative determination is made at step S62, the advance abnormality preliminary flag FAA2 is set to ON at step S66. That is, it is preliminarily determined that the actual injection start timing is not correctly advanced. If the processing at step S64 or step S66 is completed, the processing goes to step S68.

At step S68, it is determined whether or not the torque TD generated by the single injection at the delayed injection start timing INJD is smaller than the torque T0 generated by the single injection at the reference injection timing INJ0 by at least a predetermined amount. In the present embodiment, it is determined whether or not the torque TD generated by the single injection at the delayed injection start timing INJD is smaller than a value obtained by multiplying the torque T0 generated by the single injection at the reference injection timing INJO by a predetermined coefficient K2 (0<K2<1). This processing determines whether or not the actual injection start timing is correctly delayed by setting the command injection start timing INJ to the delayed side.

When the affirmative determination is made at step S68, the processing goes to step S70. At step S70, a delay abnormality preliminary flag FDA2 is set to OFF. The delay abnormality preliminary flag FDA2 relates to preliminary determination as to whether or not the actual injection start timing is correctly delayed when a command for delaying the injection start timing of the injector 24 is made. That is, at step S70, it is preliminarily determined that the actual injection start timing is correctly delayed. If the negative determination is made at step S68, the delay abnormality preliminary flag FDA2 is set to ON at step S72. That is, at step S72, it is preliminarily determined that the actual injection start timing is not correctly delayed. If the processing at step S70 or step S72 is completed, the processing goes to step S74.

At steps S74 to S84, processing for finally determining whether or not the abnormality occurs in the injection start timing is performed based upon the net number of times of the preliminary determination that the abnormality occurs in the injection start timing of the injector 24. It is determined at step S74 whether or not the abnormality preliminary flag (FAA2 or FDA2) is set to ON. When the abnormality preliminary flag (FAA2 or FDA2) is set to ON, an advance abnormality counter NAA or a delay abnormality counter NDA is incremented at step S76. When the abnormality preliminary flag (FAA2 or FDA2) is set to OFF, the advance abnormality counter NAA or the delay abnormality counter NDA is decremented at step S78. The advance abnormality counter NAA counts the net number of times of the preliminary determination that the abnormality occurs in the advanced injection start timing INJA. The delay abnormality counter NDA counts the net number of times of the preliminary determination that the abnormality occurs in the delayed injection start timing INJD.

When the processing at step S76 is completed, it is determined at step S80 whether or not the advance abnormality counter NAA or the delay abnormality counter NDA has reached a predetermined value NL. The predetermined value NL is set based upon a lower limit value, above which it is assumed that the final determination that the abnormality occurs in the injection start timing of the injector 24 can be made while maintaining high reliability. When it is determined at step S80 that the abnormality counter (NAA or NDA) has reached the predetermined value NL, an injection timing abnormality flag FINJ is set to ON and also the cylinder number causing the abnormality is stored at step S82. When the injection timing abnormality flag FINJ is set to ON, the abnormality should be preferably notified to an outside by a display 46 shown in FIG. 1.

When the negative determination is made at step S80 or when the processing at step S78 is completed, the processing goes to step S84. At step S84, the torque obtainment completion flag FT0 of the reference injection timing INJ0, which is set to ON at the processing at step S24 in FIG. 5 is set to OFF, and the torque obtainment completion flag FTA of the advanced injection start timing INJA and the torque obtainment completion flag FTD of the delayed injection start timing INJA, which are set to ON at the processing at step S54 in FIG. 6, are set to OFF. When the negative determination is made in the processing at step S60 or when the processing at step S82 or S84 is completed, the series of the processing ends once.

The above-described present embodiment exerts following effects.

(1) The presence/absence of the abnormality in the injection start timing of the injector 24 is determined based upon a magnitude relation of the torque caused by the single injections performed at the multiple command injection start timings. Thus, the presence/absence of the abnormality in the injection start timing can be determined.

(2) The multiple command injection start timings are the injection start timing substantially maximizing the torque and the start timings respectively advanced and delayed from the injection start timing substantially maximizing the torque. Thus, the correct magnitude relation of the generated torque can be grasped in advance and eventually the presence/absence of the abnormality in the injection start timing can be determined more appropriately.

(3) The injection start timing substantially maximizing the torque is the injection start timing bringing the ignition timing to the proximity of the compression top dead center. Thus, the injection start timing substantially maximizing the torque can be appropriately defined in view of the ignition timing.

(4) It is determined that no abnormality exists when the torque accompanying the single injection performed at the advanced or delayed injection start timing is lower than the torque accompanying the single injection performed at the injection start timing that brings the ignition timing to the proximity of the compression top dead center. Thus, the presence/absence of the abnormality in the injection start timing can be appropriately determined.

(5) The injection start timing substantially maximizing the torque is set as the feedforward operational amount. Thus, the processing for setting the injection start timing can be easily executed.

(6) The fuel injection for determining the presence/absence of the abnormality is performed when the fuel cut control is performed because the injection quantity defined in accordance with the required torque of the diesel engine 10 becomes equal to zero or less. Thus, by injecting a small quantity of the fuel, the torque generated through the injection of the small quantity of the fuel can be sensed. Therefore, the presence/absence of the abnormality in the injection start timing can be determined while restricting deterioration of exhaust characteristics or deterioration of drivability.

(7) The command injection quantity for the single injection is increased when the torque sensed through the single injection is less than a predetermined value. Thus, the presence/absence of the abnormality in the injection start timing can be determined with high accuracy.

(8) The torque is sensed by using a rotational state of the crankshaft (output signal of the crank angle sensor 42) as an input signal. Thus, the torque sensing device can be structured without adding a dedicated sensor.

(9) It is finally determined whether or not the abnormality occurs in the injection start timing based upon the net number of times of the preliminary determination that the abnormality occurs in the injection start timing of the injector 24. Thus, the presence/absence of the abnormality in the injection start timing can be determined with high accuracy.

Figure 8:
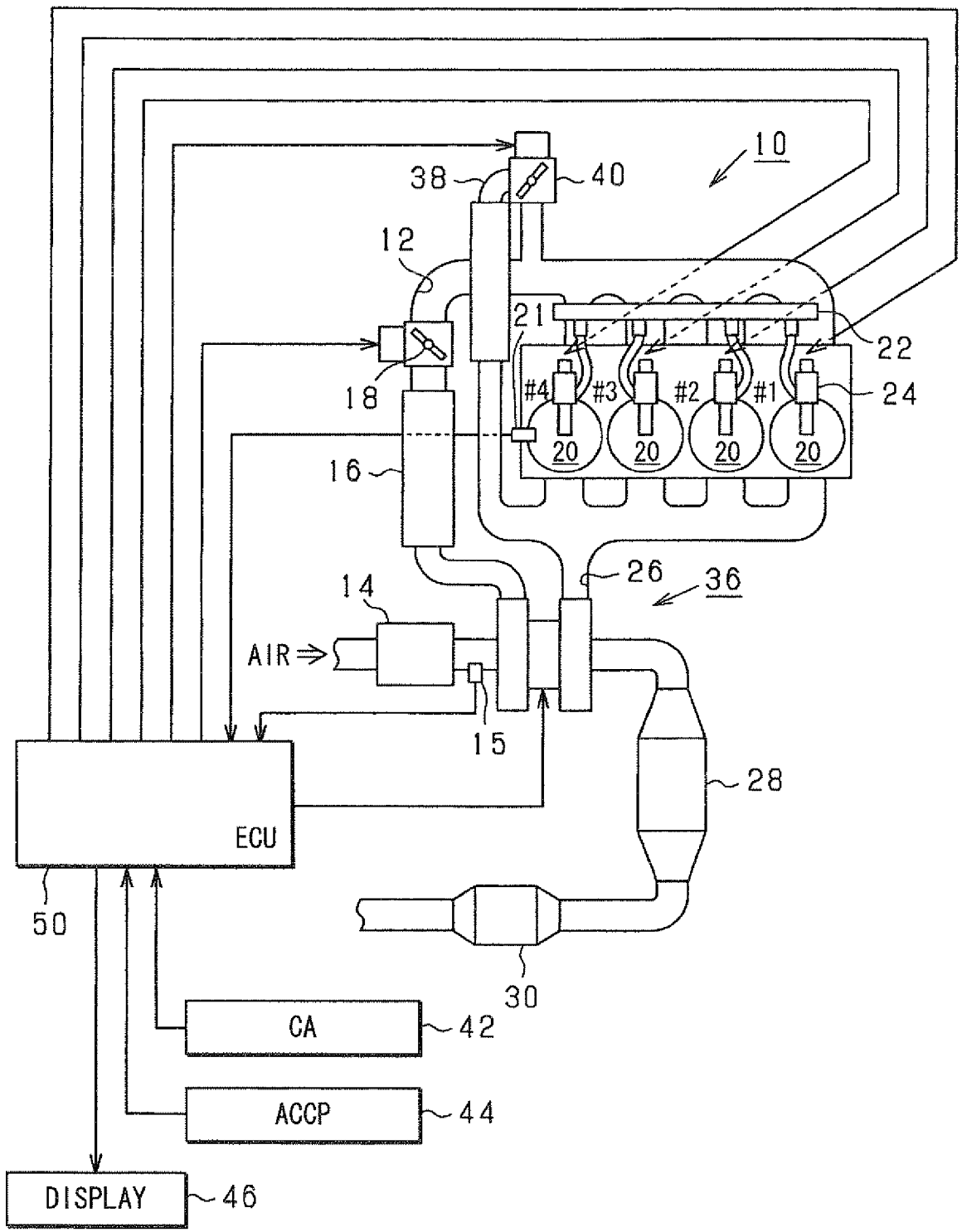
FIG. 8 is a diagram showing an entire construction of an engine system according to a second embodiment of the present invention.

Hereinafter, a second embodiment of the present invention will be explained with reference to drawings, focusing on different points from the first embodiment. FIG. 8 shows an entire construction of an engine system according to the present embodiment. As shown in FIG. 8, in the present embodiment, a specific cylinder (in this embodiment, the fourth cylinder #4) is provided with a cylinder pressure sensor 21 for sensing pressure (cylinder pressure) in the combustion chamber 20. The injection start timing is controlled for performing feedback control for bringing the ignition timing, which is grasped based upon a sensing value of the cylinder pressure sensor 21, close to the compression top dead center. Thus, the injection start timing for conforming the ignition timing to the compression top dead center is defined. In other words, the injection start timing substantially maximizing the torque is calculated. The presence/absence of the abnormality in the injection start timing can be more appropriately determined by thus calculating the injection start timing maximizing the torque as compared to a case of using the feedforward amount.

A property of the used fuel, an individual difference of the diesel engine 10 and the like are considered as the causes of the deviation of the feedforward amount from the injection start timing actually maximizing the torque. Particularly, the property of the fuel is the great cause. In the case where the feedforward amount deviates from the injection start timing actually maximizing the torque, there is a possibility that accuracy of the determination at step S62 or step S68 in FIG. 7 deteriorates. For example, in the case where the feedforward amount is deviated to the delayed side from the injection start timing actually maximizing the torque, the torque due to the single injection does not reduce even if the actual injection start timing is advanced more than the feedforward amount by setting the injection start timing to the advanced side. Therefore, there is a possibility of erroneous determination that the injection start timing is not advanced correctly. Such problem is avoided by calculating the injection start timing substantially maximizing the torque based upon the sensed ignition timing in the present embodiment.

Hereinafter, first, the sensing processing of the ignition timing will be explained. Thereafter, the determination processing of the presence/absence of the abnormality in the injection start timing according to the present embodiment will be explained.

Figure 9:
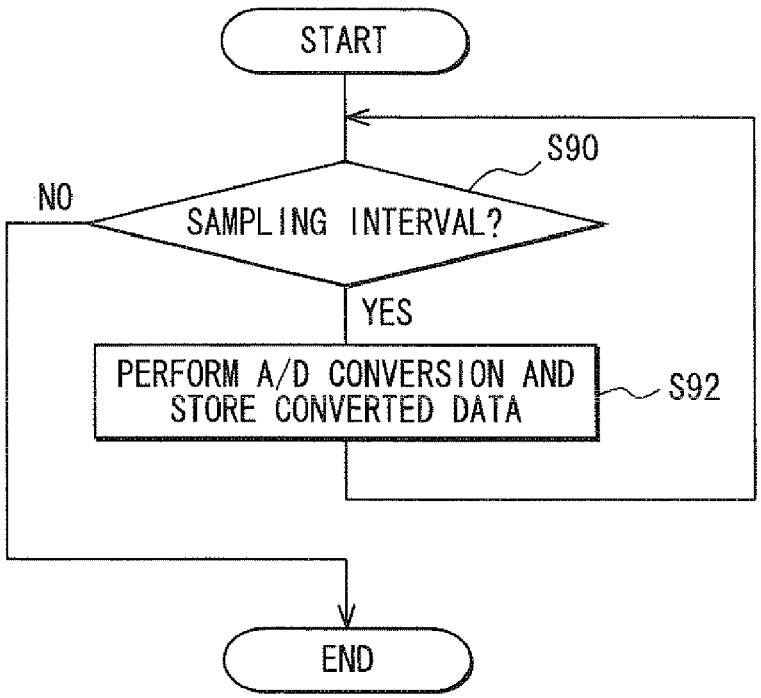
FIG. 9 is a flowchart showing a processing order of obtaining processing of an output of a cylinder pressure sensor according to the second embodiment.

FIG. 9 shows a processing order of processing for obtaining the output of the cylinder pressure sensor 21. The ECU 50 repeatedly performs the processing, for example, in a predetermined time cycle or in a predetermined crank angle cycle. In a series of the processing, first at step S90, it is determined whether or not the present time point is within an interval for sampling the pressure in the combustion chamber 20 of the fourth cylinder #4. The sampling interval is set to include an interval in which combustion of the fuel can occur in the combustion chamber 20 of the fourth cylinder #4. While the present time point is determined to be within the sampling interval, analog data outputted from the cylinder pressure sensor 21 is converted into digital data in a predetermined cycle and the digital data is stored at step S92. When the sampling interval terminates, the series of the processing ends once.

Figure 10:
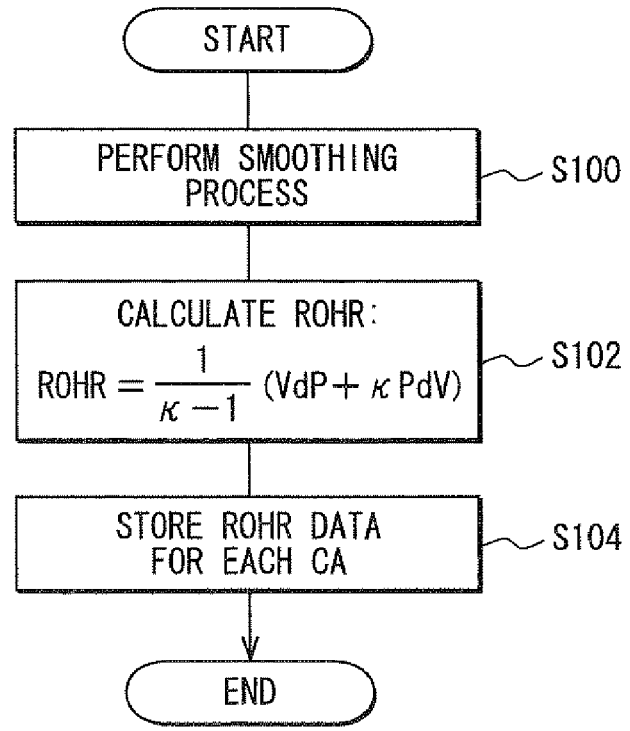
FIG. 10 is a flowchart showing a processing order of calculation processing of a heat release rate according to the second embodiment.

FIG. 10 shows a processing order of processing for calculating a rate of heat release (ROHR). The ECU 50 repeatedly performs the processing, for example, in a predetermined cycle. In a series of the processing, first at step S100 smoothing processing is applied to the cylinder pressure data obtained by the processing shown in FIG. 9 to alleviate an abrupt change of the cylinder pressure. The smoothing processing restricts an influence of accidental noises and the like and can be realized by weighted average processing, moving average processing or the like using the previous sampling value and the present sampling value. At next step S102, the heat release rate ROHR is calculated based upon the cylinder pressure data applied with the smoothing processing. In the present embodiment, the heat release rate ROHR is calculated according to a following expression (1) using the cylinder pressure P, the volume V in the combustion chamber 20 and the ratio of specific heat κ.

$$ROHR = (VdP + \kappa P dV)/(\kappa - 1) \qquad \text{Expression (1)}$$

At next step S104, the heat release rate ROHR is stored at every crank angle (CA). When the processing at step S104 is completed, the series of the processing ends once.

Figure 11:
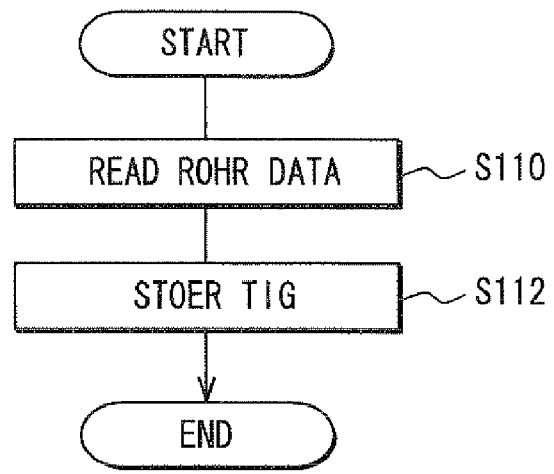
FIG. 11 is a flowchart showing a processing order of calculation processing of an ignition timing according to the second embodiment.
Figure 12:
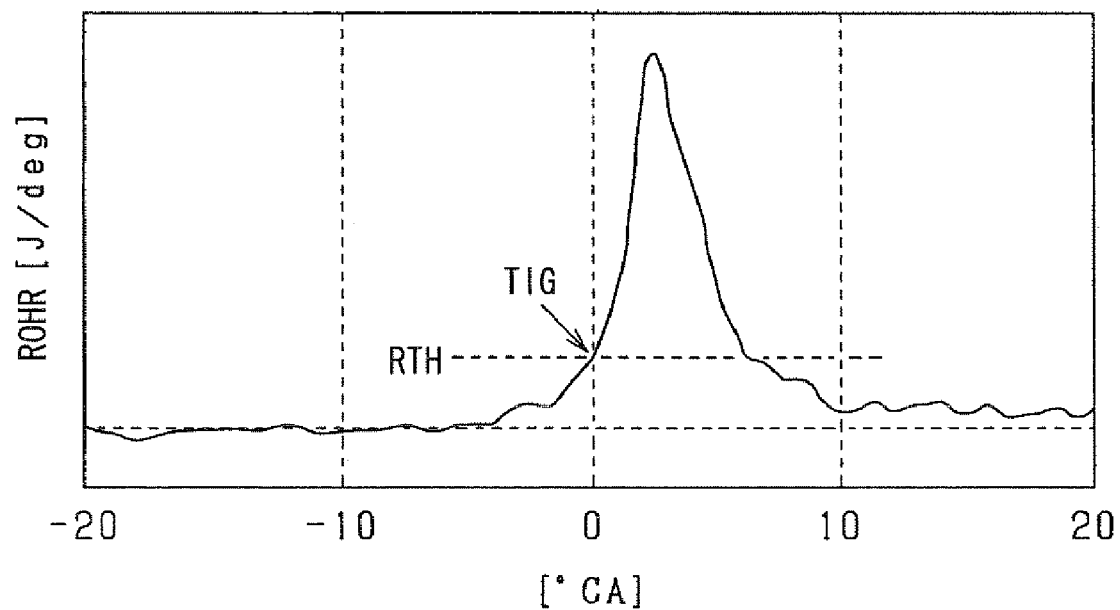
FIG. 12 is a diagram showing a calculation mode of the ignition timing according to the second embodiment.

FIG. 11 shows a processing order of processing for calculating the ignition timing of the fuel. The ECU 50 repeatedly performs the processing, for example, in a predetermined cycle. In a series of the processing, first at step S110, data of the heat release rate ROHR calculated in the processing shown in FIG. 10 is read out. At next step S112, a time point at which the heat release rate ROHR crosses a threshold value RTH from a value less than the threshold value RTH is calculated and stored as the ignition timing TIG (refer to FIG. 12). When the processing at step S112 is completed, the series of the processing ends once.

Figure 13:
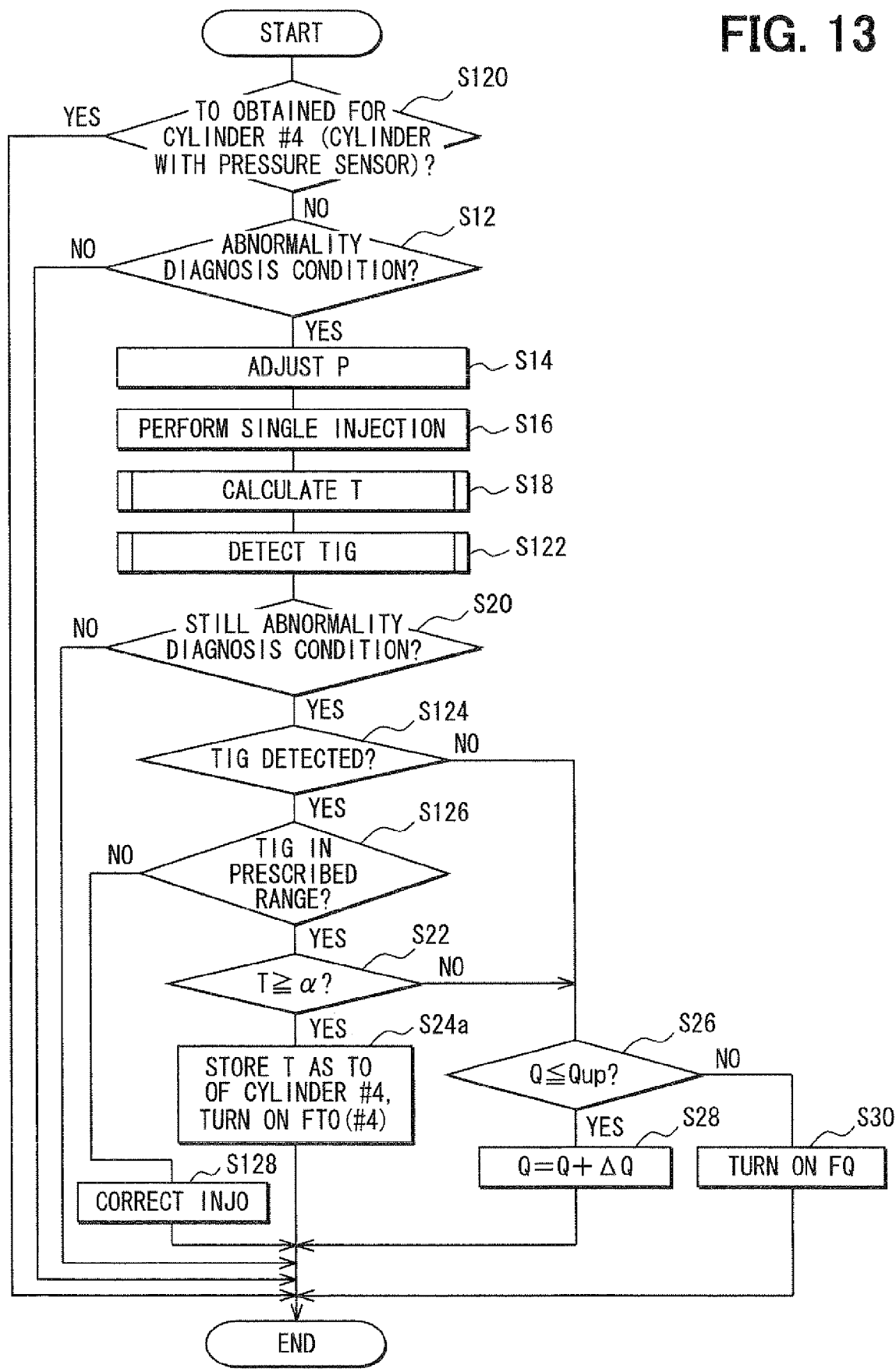
FIG. 13 is a flowchart showing a processing order of sensing processing of torque corresponding to a reference injection timing according to the second embodiment.

FIG. 13 shows a processing order of processing for performing the single injection at the injection start timing INJ0 substantially maximizing the torque in the fourth cylinder #4 equipped with the cylinder pressure sensor 21 as part of the determination processing of the presence/absence of the abnormality in the injection start timing according to the present embodiment. The ECU 50 repeatedly performs the processing, for example, in a predetermined cycle. Part of the processing shown in FIG. 13 identical to the part of the processing shown in FIG. 5 are marked with the identical step numbers for convenience.

In a series of the processing, first at step S120, it is determined whether the torque T0 caused by the single injection performed at the reference injection timing INJ0 in the fourth cylinder #4 having the cylinder pressure sensor 21 has been already obtained. This processing is for obtaining the torque T0 caused by the single injection performed at the reference injection timing INJ0 in the cylinder equipped with the cylinder pressure sensor 21 prior to the other cylinders. When negative determination is made at step S120, the processing goes to step S12.

In the present embodiment, the ignition timing TIG of the single injection is detected between step S18 and step S20 (i.e., at step S122). This processing is shown in FIGS. 9 to 12. When affirmative determination is made at step S20, the processing goes to step S124. At step S124, it is determined whether or not the ignition timing TIG is sensed. Step S124 determines whether or not the fuel of the single injection is surely used in the combustion. In the case where it is determined that the ignition timing TIG cannot be sensed, the processing goes to step S26 described above.

When it is determined that the ignition timing TIG is sensed, it is determined whether or not the ignition timing TIG is within a prescribed range at step S126. The prescribed range is defined in accordance with a range of the ignition timing substantially maximizing the torque. For example, the prescribed range is a range near the compression top dead center. When it is determined that the ignition timing TIG is within the prescribed range, the processing goes to step S22. When it is determined that the ignition timing TIG is out of the prescribed range, the processing goes to step S128. At step S128 feedback correction of the reference injection timing INJ0 is performed to bring the actual ignition timing TIG into the prescribed range. Thus, the reference injection timing INJ0 can be corrected to the injection start timing substantially maximizing the torque regardless of the fuel property or the like.

Figure 14:
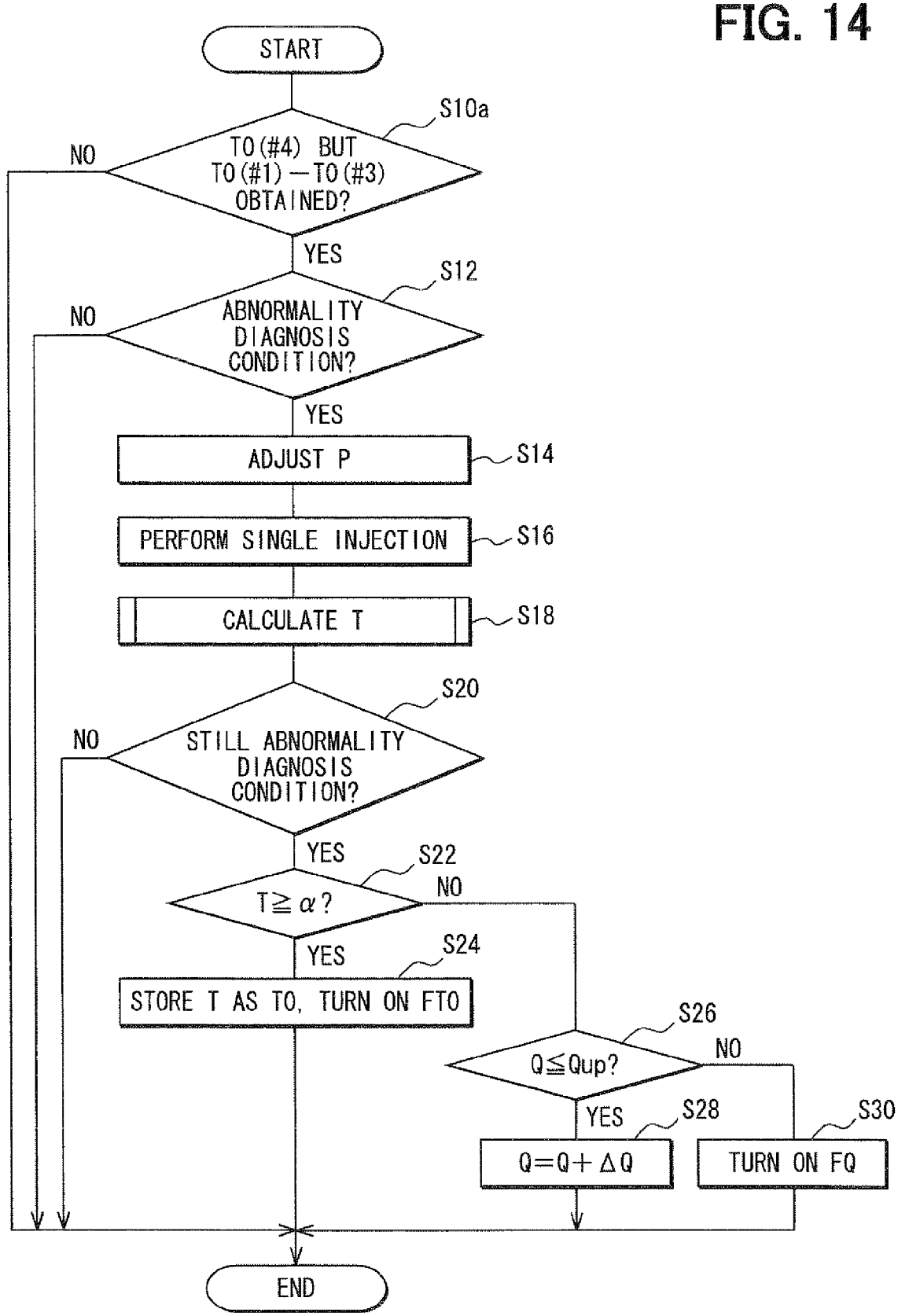
FIG. 14 is a flowchart showing a processing order of sensing processing of the torque corresponding to the reference injection timing according to the second embodiment.

FIG. 14 shows a processing order of processing for performing the single injection at the injection start timing substantially maximizing the torque in the first to third cylinders #1-#3, in which the cylinder pressure sensor 21 is not mounted, as part of the determination processing of the presence/absence of the abnormality in the injection start timing according to the present embodiment. The ECU 50 repeatedly performs the processing for each cylinder, for example, in a predetermined cycle. Part of the processing shown in FIG. 14 identical to the part of the processing shown in FIG. 5 is marked with the identical step numbers for convenience.

In a series of the processing, first at step S10a, it is determined whether the obtainment of the torque T0(#4) caused by the single injection performed at the reference injection timing INJ0 in the fourth cylinder #4 equipped with the cylinder pressure sensor 21 is complete and the obtainment of the torque (T0(#1), T0(#2) and T0(#3)) caused by the single injections at the reference injection timings in the other cylinders #1-#3 is incomplete. This processing is for obtaining the torque T0(#4) caused by the single injection at the reference injection timing INJ0 in the cylinder #4 equipped with the cylinder pressure sensor 21 prior to the other cylinders #1-#3, When affirmative determination is made at step S10a, the processing at steps S12 to S30 is executed.

Figure 15:
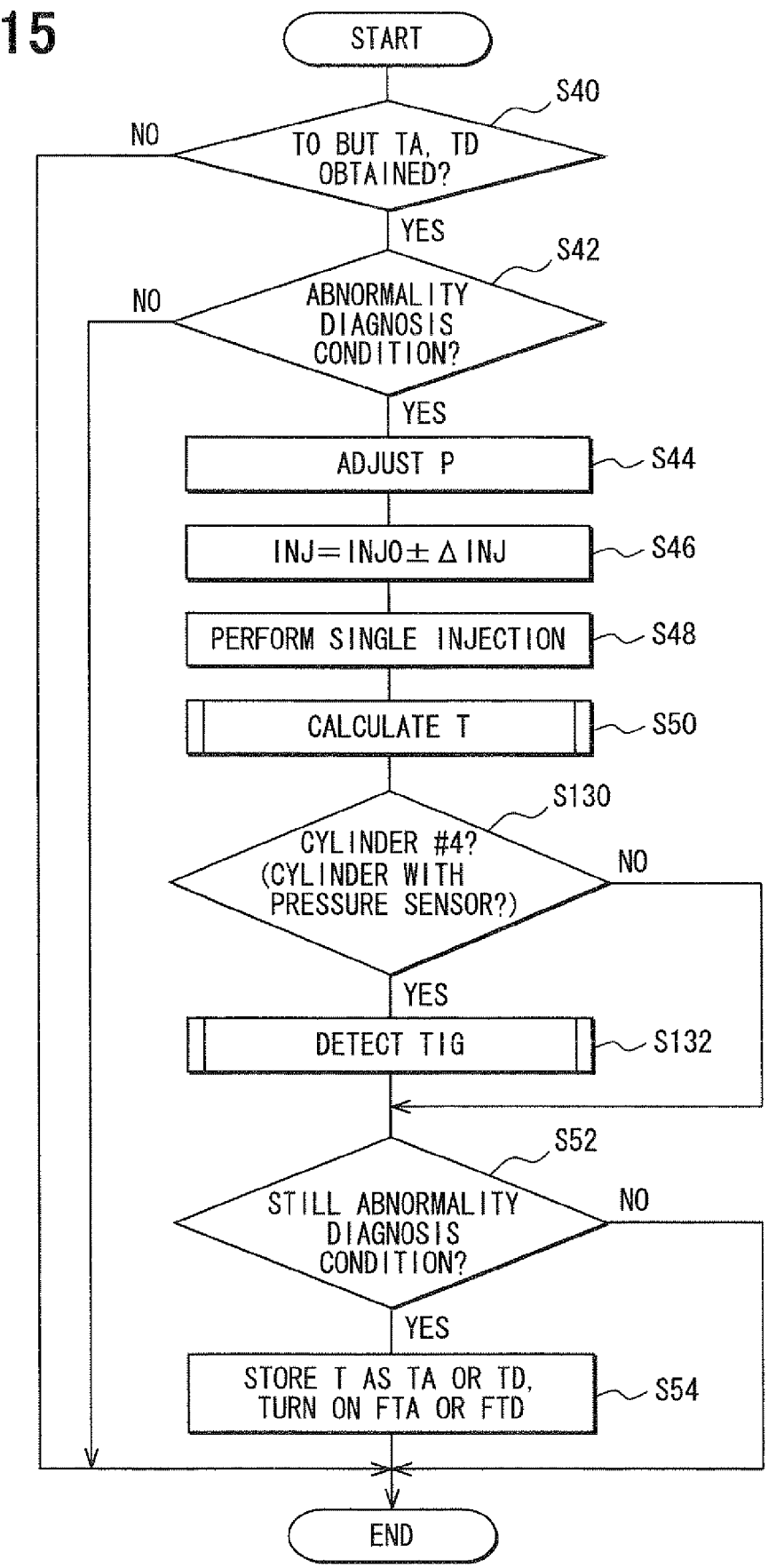
FIG. 15 is a flowchart showing a processing order of sensing processing of torque at an advanced injection timing or a delayed injection timing according to the second embodiment.

FIG. 15 shows a processing order of processing for performing the single injection at the injection start timing (INJA or INJD) advanced or delayed from the injection start timing INJ0 substantially maximizing the torque as part of the determination processing of the presence/absence of the abnormality in the injection start timing according to the present embodiment. The ECU 50 repeatedly performs the processing for each cylinder, for example, in a predetermined cycle. Part of the processing shown in FIG. 15 identical to those in the processing shown in FIG. 6 are marked with identical step numbers for convenience.

As shown in FIG. 15, in the present embodiment, when it is determined at step S130 that the fourth cylinder #4 equipped with the cylinder pressure sensor 21 is identified, the processing for sensing the ignition timing TIG is executed at step S132. This processing is shown in FIGS. 9 to 12.

Figure 16:
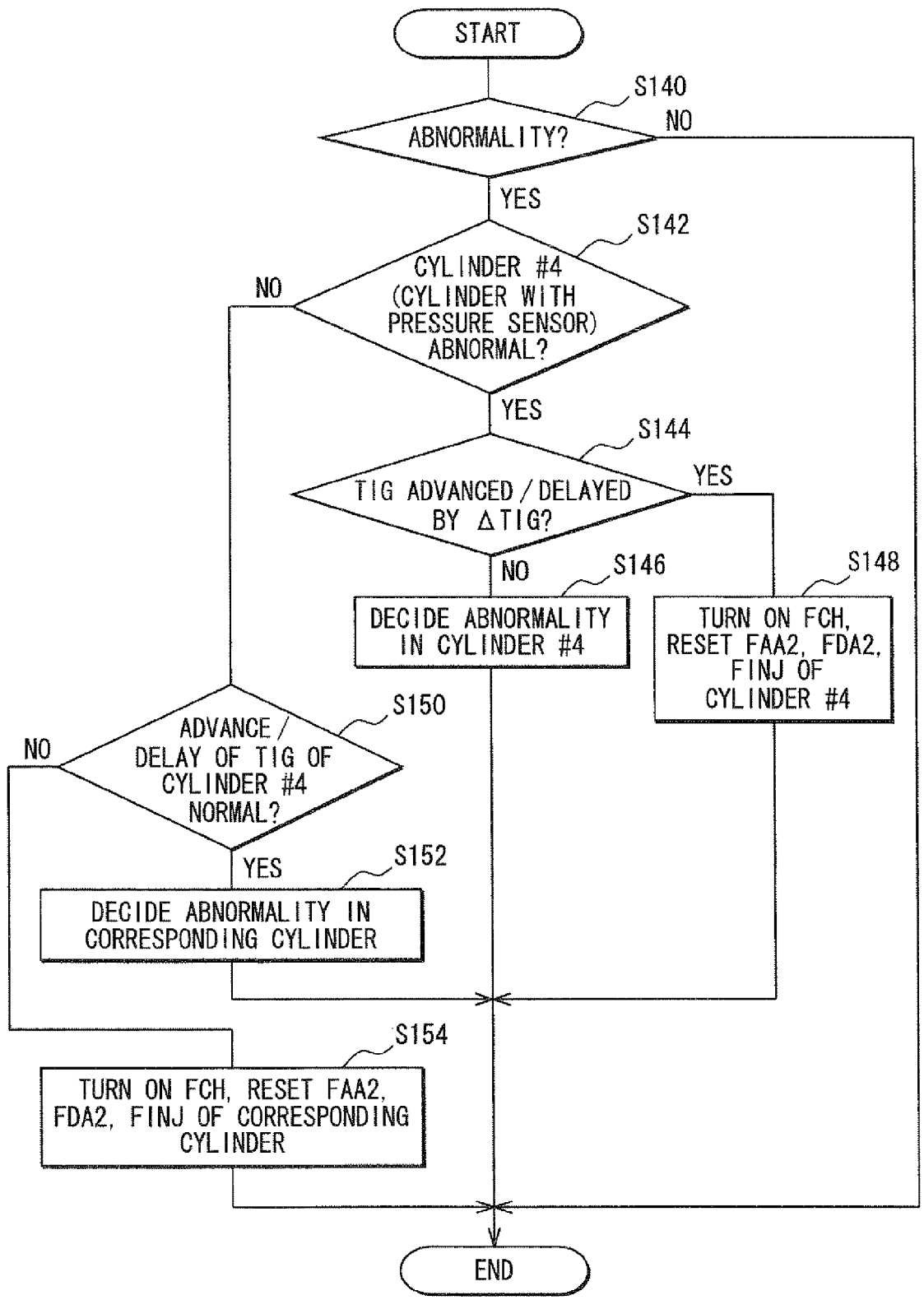
FIG. 16 is a flowchart showing a processing order of determination processing of presence/absence of abnormality in an injection start timing according to the second embodiment.

FIG. 16 shows a processing order of processing after the obtainment of the torque corresponding to the respective injection start timings as part of the determination processing of the presence/absence of the abnormality in the injection start timing according to the present embodiment. The ECU 50 repeatedly performs the processing for each cylinder when the processing at step S82 or S84 is completed.

In a series of the processing, first at step S140, it is determined whether or not the abnormality is determined to exist based upon the torque caused through the single injection. That is, it is determined whether or not the advance abnormality preliminary flag FAA2 or the delay abnormality preliminary flag FDA2 is set to ON by the processing at step S66 or step S72 of FIG. 7. When affirmative determination is made at step S140, it is determined at step S142 whether or not the cylinder determined to have the abnormality is the fourth cylinder #4 equipped with the cylinder pressure sensor 21. When it is determined that the cylinder is the fourth cylinder #4, it is determined at step S144 whether or not the ignition timing TIG due to the single injection performed through the processing shown in FIG. 15 is advanced or delayed by a predetermined amount ΔTIG. The predetermined amount ΔTIG is set in accordance with a difference between the injection timing set at step S46 in FIG. 15 and the reference injection timing INJ0. This processing is for determining whether or not the cause of setting the advance abnormality preliminary flag FAA2 or the delay abnormality preliminary flag FDA2 to ON is the abnormality of the injection timing.

In the case where the ignition timing TIG is not advanced or delayed by the predetermined amount ΔTIG, it is determined that the injection timing INJ is not advanced or delayed, and the abnormality of the fourth cylinder #4 equipped with the cylinder pressure sensor 21 is decided. That is, the processing at steps S66, S72, and S82 in FIG. 7 is decided. In the case where the ignition timing TIG is advanced or delayed by the predetermined amount ΔTIG or more, the processing goes to step S148. In this case, the torque doe not reduce compared to the case where the injection timing is set to the reference injection timing although the ignition timing is advanced or delayed. Therefore, at step S148, a checking function abnormality flag FCH showing that abnormality occurs in the checking function for determining the abnormality in the injection start timing is set to ON. For example, it is considered that the abnormality of the checking function includes abnormality in the crank angle sensor 42 or in a processing system of the output signal of the crank angle sensor 42. Further, in step S148, the advance abnormality preliminary flag FAA2 set at step S66, the delay abnormality preliminary flag FDA2 set at step S72 and the injection timing abnormality flag FINJ set at step S82 in FIG. 7 are reset. When the abnormality occurs in the checking function, the presence/absence of the abnormality in the injection start timing cannot be appropriately determined. Therefore, the previous determination about the presence/absence of the abnormality in the injection start timing is invalidated.

In the case where the cylinder determined to be abnormal at step S142 is not the fourth cylinder #4 equipped with the cylinder pressure sensor 21, the processing goes to step S50. It is determined at step S150 whether or not the ignition timing TIG due to the single injection performed through the processing of FIG. 15 is advanced or delayed by a predetermined amount in the fourth cylinder #4 equipped with the cylinder pressure sensor 21. The processing in step S150 is for determining whether or not the reference injection timing INJ0 for performing the single injection in each of the first to third cylinders equipped with no cylinder pressure sensor is an appropriate value. There is a possibility that the processing shown in FIG. 14 or 15 is executed based upon the correction of the reference injection timing T0 of the fourth cylinder #4 equipped with the cylinder pressure sensor 21. If the feedback control of the ignition timing does not function normally there is a possibility that the reference injection timing is corrected to an inappropriate value through the correction of the reference injection timing. Under such the circumstances, there is a possibility that the presence/absence of the abnormality in the injection start timing of each of the first to third cylinders #1-#3 equipped with no cylinder pressure sensor cannot be determined appropriately.

Therefore, in the present embodiment, the determination that the abnormality occurs in the injection start timing in a corresponding one of the first to third cylinders equipped with no cylinder pressure sensor is decided at step S152 only when the affirmative determination is made at step S150. That is, the advance abnormality preliminary flag FAA2 set at step S66, the delay abnormality preliminary flag FDA2 set at step S72 and the injection timing abnormality flag FINJ set at step S82 in FIG. 7 are validated. When negative determination is made at step S150, it is determined at step S154 that the abnormality occurs in the checking function for determining the presence/absence of the abnormality in the injection start timing in each of the first to third cylinders #1-#3. As a result, the checking function abnormality flag FCH is set to ON. The advance abnormality preliminary flag FAA2 set at step S66, the delay abnormality preliminary flag FDA2 set at step S72 and the injection timing abnormality flag FINJ set at step S82 in FIG. 7 are reset.

When negative determination is made in the processing at step S140 or when the processing at step S146, S148, S152 or S154 is completed, the series of the processing ends once.

The present embodiment described above further exerts a following effect in addition to the effects (1) to (4) and (6) to (9) of the first embodiment.

(10) The cylinder pressure sensor 21 is provided in a part (fourth cylinder) of the cylinders and the ignition timing grasped from the sensing value of the cylinder pressure sensor 21 is feedback-controlled to the ignition timing assumed to substantially maximize the torque. Thus, the injection start timing (reference injection timing) for realizing the assumed ignition timing is calculated. In consequence, an accurate value of the injection start timing substantially maximizing the torque can be obtained. It is because the ignition timing substantially maximizing the torque is hardly changed by the fuel property or the structural variation in the engine. Since it is required to provide the cylinder pressure sensor 21 in only part of the cylinders to perform the calculation, the increase in the number of components can be inhibited to the minimum.

Hereinafter, a third embodiment of the present invention will be explained with reference to the drawings, focusing on different points from the first embodiment. In the present embodiment, the engine system shown in FIG. 1 is used. The reference injection timing INJ0 is set (corrected) by controlling the injection start timing INJ such that the torque accompanying the single injection is feedback-controlled to the maximum prior to performing the processing shown in FIG.

Figure 17:
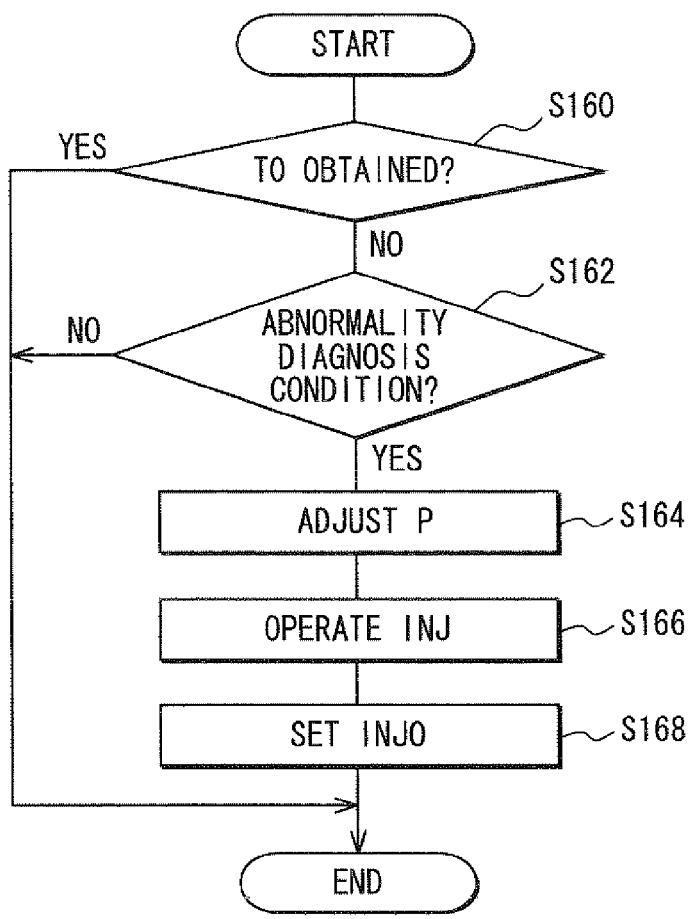
FIG. 17 is a flowchart showing a processing order of calculation processing of a reference injection timing according to a third embodiment of the present invention.

5. Hereinafter, the processing will be explained with reference to FIG. 17. FIG. 17 is a processing order of the processing performed before the execution of the processing shown in FIG. 5. The ECU 50 repeatedly performs the processing in regard to a specific cylinder (cylinder #x), for example, in a predetermined cycle.

In a series of the processing, first at step S160, it is determined whether the torque T0 accompanying the single injection performed at the reference injection timing INJ0 has been already obtained. That is, it is determined whether or not the torque obtainment completion flag FT0 of the reference injection timing INJ0 is set to ON. When negative determination is made at step S160, it is determined at step S162 whether or not an abnormality diagnosis condition is established. The abnormality diagnosis condition is the same as the condition used at step S12 in FIG. 5. When it is determined that the abnormality diagnosis condition is established, the processing goes to step S164. At step S164, the processing similar to the processing executed at step S14 in FIG. 5 is executed. The processing is executed for conforming the condition for performing the single injection in the series of the processing of setting the reference injection timing INJ0 to the condition for performing the single injection or the like at the reference injection timing INJ0 after the series of the processing.

At next step S166, the injection start timing INJ is operated to perform feedback-control for maximizing the torque T generated when the single injection is performed. In the present embodiment, a predetermined reference injection timing should be preferably used as a feedforward amount, and the feedback control should be preferably the processing for obtaining a correction amount corresponding to the reference injection timing. The injection quantity is set to be the same as the injection quantity of the single injection or the like performed at the reference injection timing INJ0 after the series of the processing. When the torque generated by the single injection can be maximized, the reference injection timing INJ0 is set to the injection start timing INJ maximizing the torque at step S168.

When affirmative determination is made in the processing at step S160, when negative determination is made in the processing at step S162 or when the processing at step S168 is completed, the series of the processing ends once, Thereafter, the processing shown in FIGS. 5 to 7 is executed.

The present embodiment described above further exerts a following effect in addition to the effects (1) to (4) and (6) to (9) of the first embodiment.

(11) The injection start timing is operated for feedback-controlling the output torque of the diesel engine 10 to the maximum. Thus, the injection start timing substantially maximizing the torque is calculated. In consequence, an accurate value of the injection start timing substantially maximizing the torque can be obtained.

Figure 18:
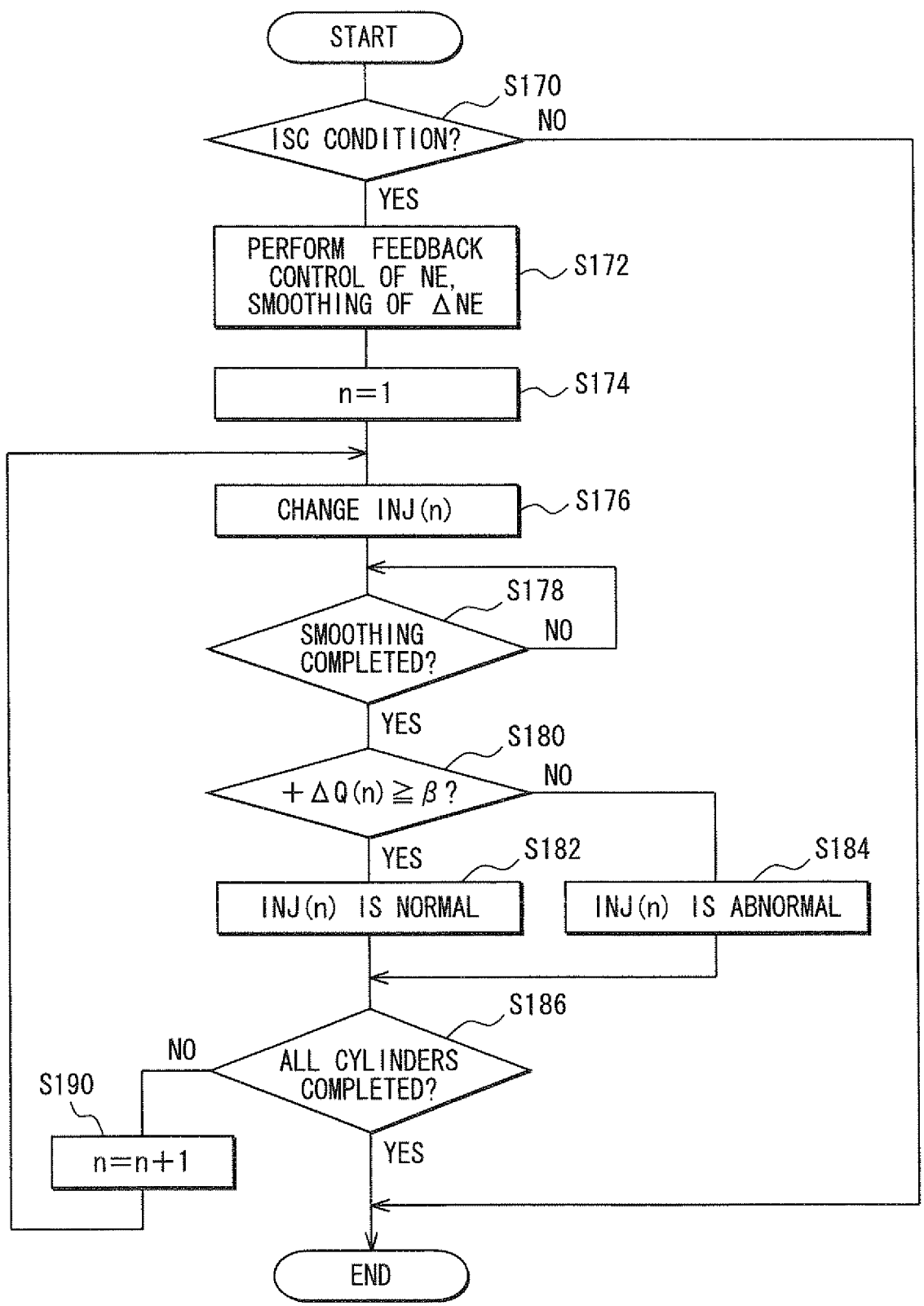
FIG. 18 is a flowchart showing a processing order of determination processing of presence/absence of abnormality in an injection start timing according to a fourth embodiment of the present invention.

Hereinafter, a fourth embodiment of the present invention will be explained with reference to the drawings, focusing on different points from the first embodiment. In the present embodiment, the presence/absence of the abnormality in the injection start timing is determined during idle rotation speed control. FIG. 18 shows a processing order of the determination processing for the presence/absence of the abnormality in the injection start timing according to the present embodiment. The ECU 50 repeatedly performs the processing, for example, in a predetermined cycle.

Figure 19:
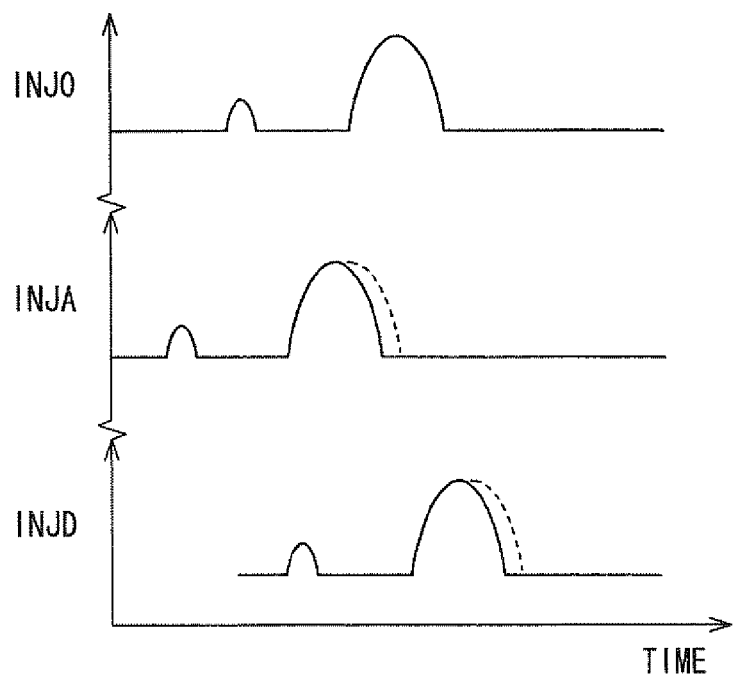
FIG. 19 is a time chart showing a fuel injection pattern according to the fourth embodiment.

In a series of the processing, it is first determined at step S170 whether or not an execution condition of the idle rotation speed control is established. When the execution condition of the idle rotation speed control is established, the processing goes to step S172. At step S172, actual rotation speed NE of the crankshaft is feedback-controlled to target rotation speed and also processing for smoothing an increase amount ΔNE of the rotation speed NE caused by the combustion of the fuel injected into each cylinder is executed. Here, the actual rotation speed NE is feedback-controlled to the target rotation speed by uniformly correcting an injection quantity in an injection pattern regarding a predetermined injection start timing INJ0 shown in FIG. 19 in all the cylinders. The rotation fluctuation among the cylinders is smoothed by correcting the injection quantity of each cylinder individually. The injection pattern INJ0 shown in FIG. 19 is an injection pattern based upon the injection start timing INJ0 assumed to maximize the torque.

At next step S174, a cylinder for determining the presence/absence of the abnormality in the injection start timing is set to the first cylinder #1. At step S176, the injection start timing INJ(n) of the nth cylinder is changed to an advanced injection timing INJA or a delayed injection timing INJD respectively shown in FIG. 19. It is considered that the torque generated by combustion of the fuel in the nth cylinder reduces if the actual injection start timing INJ is changed to the advanced side or the retarded side. The reduction of the torque is compensated by an increase in the fuel injection quantity of the nth cylinder as shown by broken lines in FIG. 19. Accordingly, the increase in the fuel injection quantity of the nth cylinder is a parameter quantifying the reduction of the torque. If there is a possibility that the correction of the injection quantity is made uniformly in all the cylinders, the uniform correction of the injection quantity in all the cylinders may be prohibited.

When the smoothing processing of the rotation fluctuation is completed (step S178: YES), the processing goes to step S180. At step S180, it is determined whether or not the increase (+ΔQ(n)) in the fuel injection quantity Q(n) of the nth cylinder caused by the processing at step S176 is equal to or greater than a predetermined quantity β. This processing is for determining whether or not the torque is reduced by the processing at step S176. The predetermined quantity β is set based upon a torque amount that is reduced by changing the injection start timing INJ to the advanced side or the delayed side. When affirmative determination is made at step S180, it is determined at step S182 that the injection start timing INJ(n) of the nth cylinder is normal. When it is determined that the increase +ΔQ(N) in the fuel injection quantity Q(n) of the nth cylinder is less than the predetermined quantity β, it is determined at step S184 that the injection start timing INJ(n) of the nth cylinder is abnormal. When the processing at step S182 or S184 is completed, it is determined at step S186 whether or not the determination of the presence/absence of the abnormality in the injection start timing in all the cylinders is completed. When the determination of the presence/absence of the abnormality in the injection start timing in all the cylinders is not completed, the cylinder number n is incremented at step S190 and the processing goes to step S176.

When negative determination is made in the processing at step S170 or when affirmative determination is made in the processing at step S186, the series of the processing ends once.

The present embodiment described above exerts effects similar to the effects (1) to (5) and (8) of the first embodiment.

Each embodiment described above may be modified as follows (A) In the second embodiment, in the case where the ignition timing does not advance or delay although the command injection start timing of the fourth cylinder equipped with the cylinder pressure sensor 21 is advanced or delayed relative to the reference injection timing, the feedforward operational amount may be used as the reference injection timing to determine the presence/absence of the abnormality in the injection start timing of each of the first to third cylinders as in the case of the first embodiment.

(B) In the first to third embodiments, the single injection is performed at the reference injection timing, the advanced injection start timing and the delayed injection start timing. Alternatively, the single injection may be performed at the reference injection timing and either one of the advanced injection start timing and the delayed injection start timing.

(D) In the first to fourth embodiments, the reference injection timing is not limited to the injection start timing substantially maximizing the torque. Any reference injection timing may be used as long as the presence/absence of the abnormality in the injection start timing is determined based upon a difference in torque caused by the fuel injections performed at multiple injection start timings.

(E) The torque sensing scheme for sensing torque is not limited to the scheme based upon an output signal of the crank angle sensor 42. Alternatively, a sensor for directly sensing the torque may be used.

(F) The diesel engine 10 is not limited to a four-cylinder internal combustion engine.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel injection controller for performing fuel injection control by operating an injector of a compression ignition type internal combustion engine, the fuel injection controller comprising:
    an injection means for setting a plurality of command injection start timings commanded to the injector to inject fuel from the injector;
    a torque sensing means for sensing torque generated by the fuel injection performed by the injection means; and
    a determining means for determining presence/absence of abnormality in injection start timing of the injector based upon a magnitude relation between sensing values of the torque sensing means respectively corresponding to the command injection start timings.

2. The fuel injection controller according to claim 1, wherein
    the command injection start timings include a certain injection start timing substantially maximizing the torque and at least one of a start timing advanced from the certain injection start timing and a start timing delayed from the certain injection start timing.

3. The fuel injection controller according to claim 2, wherein
    the certain injection start timing substantially maximizing the torque is an injection start timing that provides an ignition timing near a compression top dead center.

4. The fuel injection controller according to claim 3, wherein
    the determining means determines that the abnormality does not occur when the sensing value provided when the command injection start timing is set to at least one of the advanced start timing and the delayed start timing is less than the sensing value provided when the command injection start timing is set to the injection start timing that provides the ignition timing near the compression top dead center.

5. The fuel injection controller according to claim 2, wherein
    the certain injection start timing substantially maximizing the torque is set as a feedforward operational amount.

6. The fuel injection controller according to claim 2, wherein the engine is a multi-cylinder internal combustion engine and has a pressure sensing means in a part of a plurality of cylinders for sensing pressure in a combustion chamber of the engine, the fuel injection controller further comprising:
    a calculating means for performing feedback-control of conforming an ignition timing grasped from a sensing value of the pressure sensing means to an ignition timing assumed to substantially maximize the torque, thereby calculating an injection start timing realizing the assumed ignition timing.

7. The fuel injection controller according to claim 2, further comprising:
    a calculating means for operating the injection start timing to perform feedback-control for maximizing output torque of the engine, thereby calculating the injection start timing maximizing the torque.

8. The fuel injection controller according to claim 1, wherein
    the injection means performs the fuel injection for determining the presence/absence of the abnormality when fuel cut control is performed because an injection quantity defined in accordance with required torque of the engine becomes equal to or less than zero.

9. The fuel injection controller according to claim 8, further comprising:
    an increasing means for increasing the injection quantity of the fuel injected by the injection means prior to the determination of the determining means when the sensing value is equal to or less than a predetermined value.

10. The fuel injection controller according to claim 1, wherein
    the torque sensing means senses the torque by using a rotational state of a crankshaft of the engine accompanying the fuel injection performed by the injection means as an input signal.

* * * * *